United States Patent
Kurakami et al.

(10) Patent No.: US 10,735,564 B2
(45) Date of Patent: Aug. 4, 2020

(54) FLOW INFORMATION ANALYSIS APPARATUS, FLOW INFORMATION ANALYSIS METHOD, AND FLOW INFORMATION ANALYSIS PROGRAM

(71) Applicant: NIPPON TELEGRAPH AND TELEPHONE CORPORATION, Tokyo (JP)

(72) Inventors: Hiroshi Kurakami, Tokyo (JP); Kazunori Kamiya, Tokyo (JP); Hiroyuki Nooka, Tokyo (JP); Daigo Natsume, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/334,373

(22) PCT Filed: Aug. 9, 2017

(86) PCT No.: PCT/JP2017/028940
§ 371 (c)(1),
(2) Date: Mar. 19, 2019

(87) PCT Pub. No.: WO2018/066228
PCT Pub. Date: Apr. 12, 2018

(65) Prior Publication Data
US 2019/0230198 A1    Jul. 25, 2019

(30) Foreign Application Priority Data
Oct. 6, 2016 (JP) ................................. 2016-198375

(51) Int. Cl.
*H04L 29/06* (2006.01)
*H04L 12/26* (2006.01)
(Continued)

(52) U.S. Cl.
CPC ............ *H04L 69/22* (2013.01); *H04L 43/022* (2013.01); *H04L 43/026* (2013.01);
(Continued)

(58) Field of Classification Search
CPC ... H04L 69/22; H04L 63/1458; H04L 43/022; H04L 43/026; H04L 63/1425; H04L 43/0876; H04L 47/2483; H04L 47/34
See application file for complete search history.

(56) References Cited

U.S. PATENT DOCUMENTS

| | | | |
|---|---|---|---|
| 7,797,411 B1 | 9/2010 | Guruswamy et al. | |
| 2003/0026251 A1* | 2/2003 | Morris | H04L 49/90 370/389 |
| 2012/0087313 A1* | 4/2012 | Yin | H04W 48/16 370/328 |

FOREIGN PATENT DOCUMENTS

| | | |
|---|---|---|
| EP | 2 667 545 A1 | 11/2013 |
| JP | 2003-060727 A | 2/2003 |

(Continued)

OTHER PUBLICATIONS

Claise, "Cisco Systems NetFlow Services Export Version 9", RFC 3954, Oct. 2004, pp. 1-33.
(Continued)

*Primary Examiner* — Afshawn M Towfighi
(74) *Attorney, Agent, or Firm* — Xsensus LLP

(57) ABSTRACT

A flow information analysis apparatus receives flow information containing a header sample, determines whether the header sample of the flow information matches any of templates that are based on tunneling protocols, and when determining that the header sample matches any of the templates, extract information on a header of the IP packet from the header sample on the basis of the matched template. Further, when determining that the header sample does not match any of the templates, the flow information analy-
(Continued)

sis apparatus extracts information on the header of the IP packet from the header sample on the basis of a result of a search through the header sample for a byte sequence that matches search data in which a value that is set in a specific field of the tunnel header and a value that is set in a specific field of the IP packet are combined.

6 Claims, 6 Drawing Sheets

(51) Int. Cl.
    *H04L 12/851*    (2013.01)
    *H04L 12/801*    (2013.01)
(52) U.S. Cl.
    CPC ...... *H04L 43/0876* (2013.01); *H04L 47/2483* (2013.01); *H04L 47/34* (2013.01); *H04L 63/1425* (2013.01); *H04L 63/1458* (2013.01)

(56) References Cited

FOREIGN PATENT DOCUMENTS

| JP | 2013-255196 A | 12/2013 |
| JP | 2017-098907 A | 6/2017 |

OTHER PUBLICATIONS

Philavong et al., "Failure Detection Scheme in Underlay Network", IEICE Technical Report, vol. 109, No. 5, 2009, 9 pages.
International Search Report dated Oct. 31, 2017 for PCT/JP2017/028940 filed on Aug. 9, 2017, 8 pages including English Translation.
Extended European Search Report dated Mar. 13, 2020, issued in corresponding European Patent Application No. 17858068.4.

* cited by examiner

FLOW INFORMATION ANALYSIS APPARATUS, FLOW INFORMATION ANALYSIS METHOD, AND FLOW INFORMATION ANALYSIS PROGRAM

CROSS-REFERENCE TO RELATED APPLICATIONS

The present application is based on PCT filing PCT/JP2017/028940, filed Aug. 9, 2017 which claims priority to JP 2016-198375 filed Oct. 6, 2016, both of which are incorporated herein by reference.

FIELD

The present invention relates to a flow information analysis apparatus, a flow information analysis method, and a flow information analysis program.

BACKGROUND

In IP networks, attacks represented by a distributed denial of service (DDoS) attack to networks are increasing, and the importance of monitoring and analyzing traffic is increasing. As a traffic analysis technology, a method using flow information that is output by a networking equipment, such as NetFlow, sFlow, or Internet protocol flow information export (IPFIX), is known (for example, see Non Patent Literature 1). With the traffic analysis technology using flow information as described above, it is possible to analyze a traffic amount for each piece of information, such as a transmission/reception IP address, a protocol, or a port number.

CITATION LIST

Patent Literature

Non Patent Literature 1: B. Claise, Cisco Systems NetFlow Services Export Version 9. RFC 3954, October 2004.

SUMMARY

Technical Problem

However, the conventional traffic analysis technology using flow information has a problem in that when a tunneling protocol is used in a network, it may be difficult to analyze detailed information on a user packet in a tunnel. For example, in analysis using NetFlow v9, a tunneling protocol, such as a Layer 2 Tunneling Protocol (L2TP) or a Generic Routing Encapsulation (GRE), is not assumed, and obtainable information is limited to those related to a tunnel header. Therefore, in the analysis using NetFlow v9, in some cases, it is difficult to analyze detailed information, such as a transmission/reception IP address, a protocol, or a port number, on a user packet in a tunnel.

Solution to Problem

To solve a problem and to achieve an object, A flow information analysis apparatus includes: a receiving unit configured to receive flow information that contains a header sample that is a part of an IP packet to which a tunnel header is added; a first analysis unit configured to determine whether the header sample of the flow information matches any of templates that are based on tunneling protocols, and when determining that the header sample matches any of the templates, extract information on a header of the IP packet from the header sample on the basis of the matched template; and a second analysis unit configured to, when the first analysis unit determines that the header sample of the flow information does not match any of the templates, search through the header sample for a byte sequence that matches search data in which a value that is set in a specific field of the tunnel header and a value that is set in a specific field of the IP packet are combined, and extract information on the header of the IP packet from the header sample on the basis of a result of the search.

To solve a problem and to achieve an object, a flow information analysis method implemented by a flow information analysis apparatus, the flow information analysis method includes: a receiving step of receiving flow information that contains a header sample that is a part of an IP packet to which a tunnel header is added; a first analysis step of determining whether the header sample of the flow information matches any of templates that are based on tunneling protocols, and when determining that the header sample matches any of the templates, extracting information on a header of the IP packet from the header sample on the basis of the matched template; and a second analysis step of, when it is determined that the header sample of the flow information does not match any of the templates at the first analysis step, searching through the header sample for a byte sequence that matches search data in which a value that is set in a specific field of the tunnel header and a value that is set in a specific field of the IP packet are combined, and extracting information on the header of the IP packet from the header sample on the basis of a result of the search Advantageous Effects of Invention According to the present invention, even when a tunneling protocol is used in a network, it is possible to analyze detailed information on a user packet in a tunnel.

DESCRIPTION OF EMBODIMENTS

Embodiments of a flow information analysis apparatus, a flow information analysis method, and a flow information analysis program according to the present invention will be described below based on the drawings. The present invention is not limited by the embodiments below.

Configuration of First Embodiment

Figure 1:
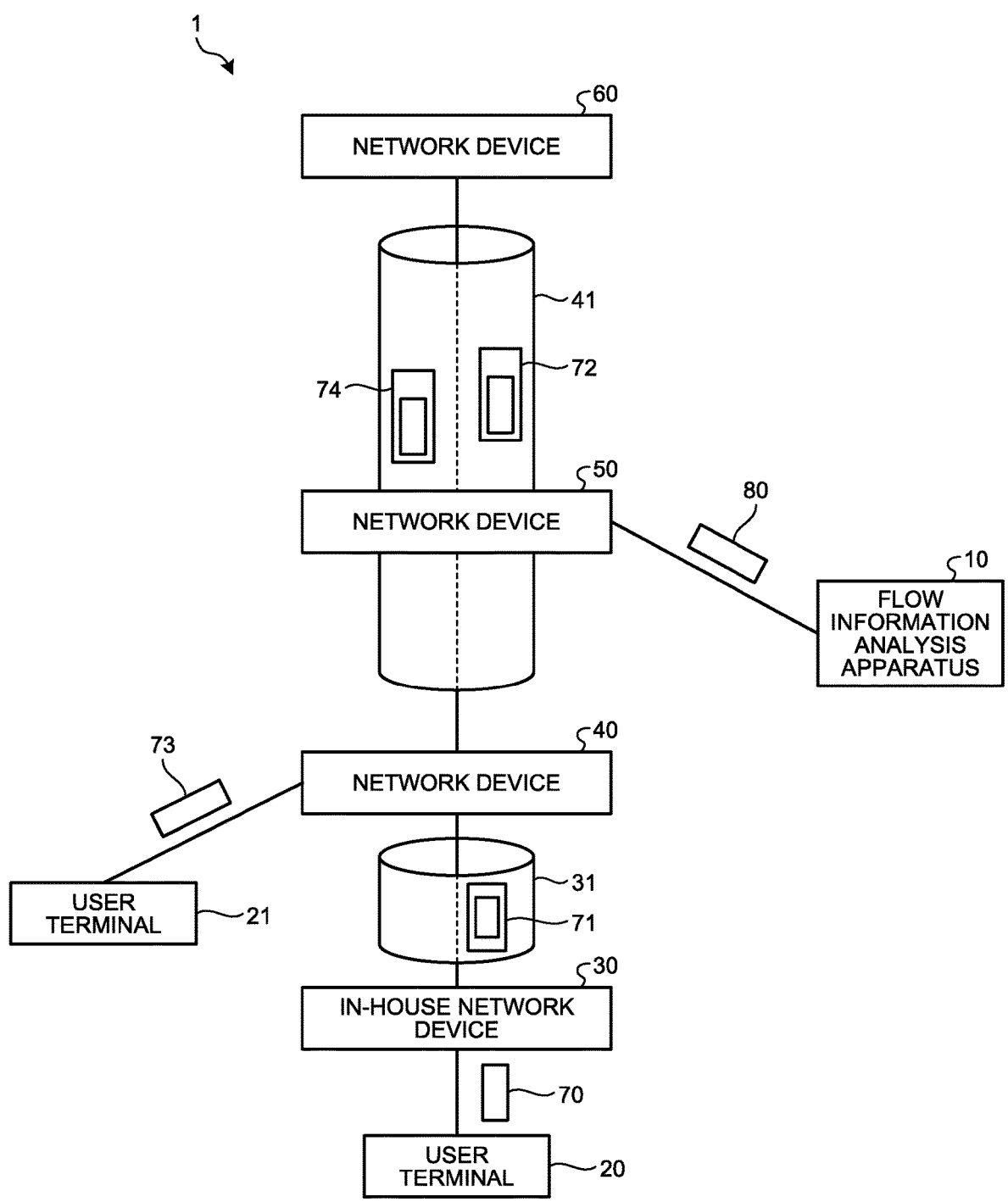
FIG. 1 is a diagram illustrating an example of a configuration of an IP network according to a first embodiment.

First, a configuration of an IP network including a flow information analysis apparatus according to a first embodiment will be described with reference to FIG. 1. FIG. 1 is a diagram illustrating an example of the IP network according to the first embodiment. As illustrated in FIG. 1, an IP network 1 includes a flow information analysis apparatus 10, user terminals 20 and 21, an in-house network device 30, and network devices 40, 50, and 60. Each of the user terminals is, for example, a terminal with a communication function, such as a personal computer or a smartphone. Further, each of the network devices is, for example, a router or the like.

As illustrated in FIG. 1, the user terminal 20 is connected to the in-house network device 30. Further, the user terminal 21 is connected to the network device 40. Furthermore, the in-house network device 30 is connected to the user terminal 20 and the network device 40. Moreover, a tunnel 31 is installed between the in-house network device 30 and the network device 40 by using a tunneling protocol, such as PPPoE.

The network device 40 is connected to the user terminal 21, the in-house network device 30, and the network device 50. Further, a tunnel 41 is installed between the network device 40 and the network device 60 by using a tunneling protocol, such as L2TP and IPv4 over IPv6 (IP-IP). The network device 50 is connected to the network device 40, the network device 60, and the flow information analysis apparatus 10.

In the following description, a tunnel packet indicates a packet that is encapsulated based on a tunneling protocol. Further, a user packet indicates a packet that is sent from the user terminal and that is not yet encapsulated, or a packet that is obtained by decapsulating a tunnel packet, i.e., by removing a tunnel header from the tunnel packet. In particular, a user packet that is encapsulated in a tunnel will be referred to as an internal user packet. Further, it is assumed that the user packet is an IP packet. The IP packet includes an IPv4 packet, an IPv6 packet, and the like.

The user terminal 20 transmits an IP packet 70 that is a user packet. Then, the in-house network device 30 encapsulates the IP packet 70 sent from the user terminal 20 by adding a tunnel header using a tunneling protocol, such as PPPoE. Then, the in-house network device 30 transmits a tunnel packet 71 that is the encapsulated IP packet 70 to the network device 40.

The network device 40 decapsulates the tunnel packet 71 received from the in-house network device 30 by terminating the tunneling protocol, such as PPPoE. The network device 40 encapsulates the decapsulated IP packet 70 by adding a header to the packet using a tunneling protocol, such as L2TP. Then, the network device 40 transmits a tunnel packet 72 that is the encapsulated IP packet 70 to the network device 50.

The network device 50 transmits and receives encapsulated packets between the network device 40 and the network device 60. Further, the network device 50 takes a sample of the transmitted and received tunnel packet 72, and creates flow information 80, such as sFlow, IPFIX, or Flexible NetFlow. Then, the network device 50 transmits the created flow information 80 to the flow information analysis apparatus 10. The flow information analysis apparatus 10 receives and analyzes the flow information 80 that is transmitted by the network device 50. A detailed configuration of the flow information analysis apparatus 10 will be described later.

Further, the network device 50 transfers the tunnel packet 72 received from the network device 40 to the network device 60. Then, the network device 60 decapsulates the tunnel packet 72 that has been encapsulated using L2TP or the like.

The user terminal 21 transmits an IP packet 73 that is a user packet. Then, the network device 40 encapsulates the IP packet 73 received from the user terminal 21 by adding a header to the packet using a tunneling protocol, such as L2TP. Then, the network device 40 transmits a tunnel packet 74 that is the encapsulated IP packet 73 to the network device 50.

The network device 50 takes a sample of the tunnel packet 74 and creates the flow information 80, such as sFlow, IPFIX, or Flexible NetFlow, similarly to the case of the tunnel packet 72. Then, the network device 50 transmits the created flow information 80 to the flow information analysis apparatus 10.

Further, for example, the network device 50 transfers the tunnel packet 74 received from the network device 40 to the network device 60. Then, the network device 60 decapsulates the tunnel packet 74 that has been encapsulated using L2TP or the like.

Meanwhile, in the IP network 1, a packet other than the tunnel packet may be generated. Further, a tunnel is established between the network device 40 and the network device 60 by a tunneling protocol that establishes an unencrypted tunnel and that encapsulates a user packet by adding a header to the packet. Examples of the tunneling protocol as described above include IP-IP, L2TP, and GRE.

Figure 2:
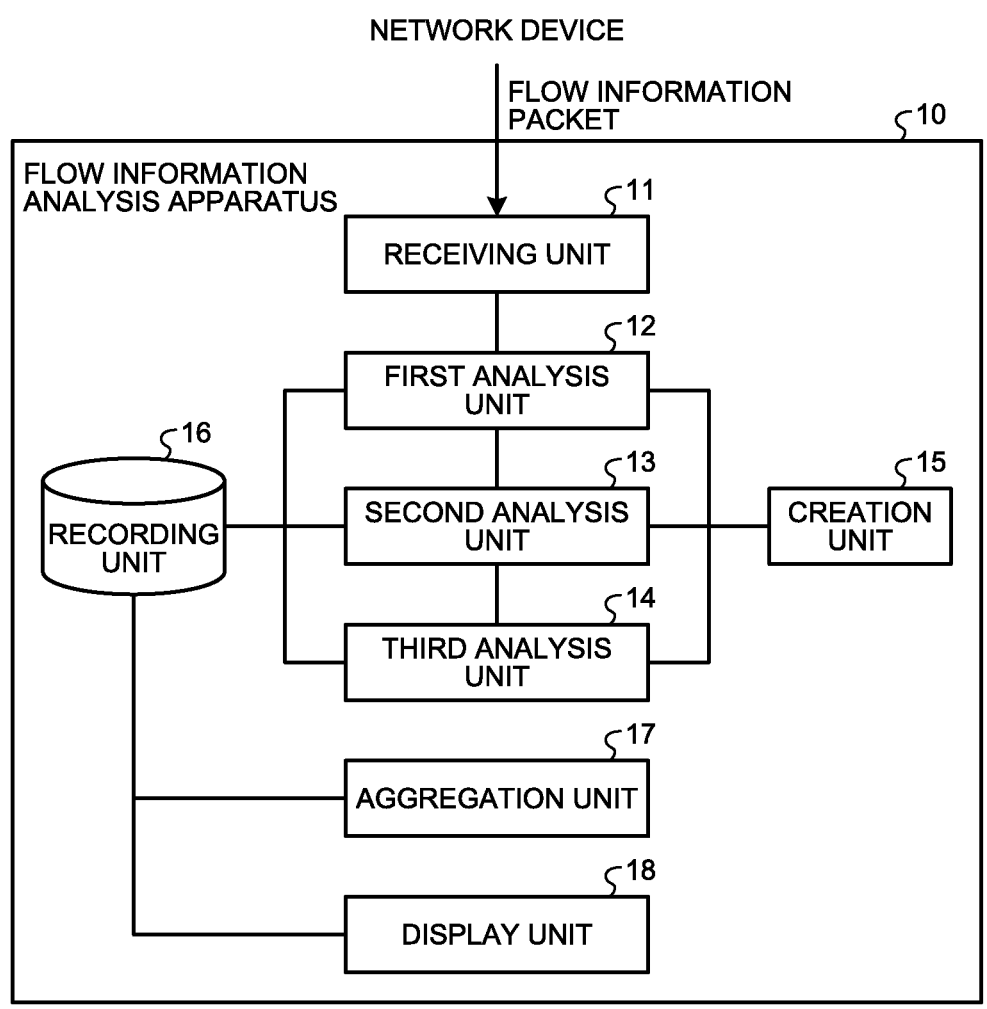
FIG. 2 is a diagram illustrating an example of a configuration of a flow information analysis apparatus according to the first embodiment.

A configuration of the flow information analysis apparatus 10 will be described below with reference to FIG. 2. FIG. 2 is a diagram illustrating an example of the flow information analysis apparatus according to the first embodiment. As illustrated in FIG. 2, the flow information analysis apparatus 10 includes a receiving unit 11, a first analysis unit 12, a second analysis unit 13, a third analysis unit 14, a creation unit 15, a recording unit 16, an aggregation unit 17, and a display unit 18.

Figure 3:
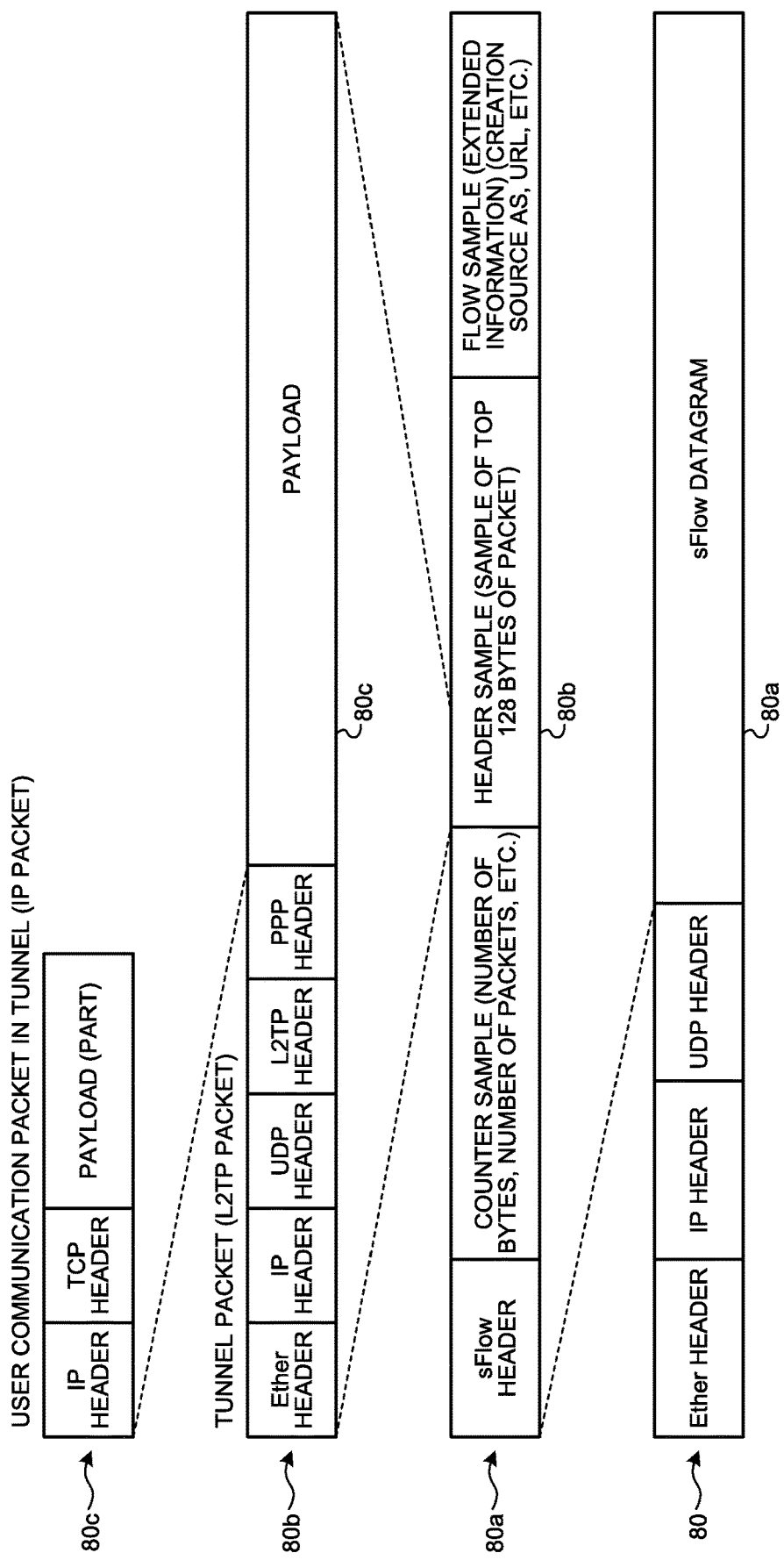
FIG. 3 is a diagram for explaining flow information according to the first embodiment.

The receiving unit 11 receives the flow information 80 that contains a header sample that is a part of the IP packet to which the tunnel header is added. Here, a configuration of the flow information 80 in a case where a tunneling protocol used by the network device 40 is L2TP will be described with reference to FIG. 3. FIG. 3 is a diagram for explaining flow information according to the first embodiment. As illustrated in FIG. 3, the flow information 80 contains an Ether header, an IP header, a UDP header, and a sFLow datagram.

As illustrated in FIG. 3, an sFLow datagram 80a contains an sFlow header, a counter sample, a header sample, and a flow sample. The counter sample is, for example, the number of bytes or the number of packets of sampled packets. Further, the header sample is, for example, top 128 bytes of a sampled packet. Furthermore, the flow sample is, for example, extended information, such as creation source AS information or a URL, on a sampled packet.

Moreover, as illustrated in FIG. 3, a header sample 80b contains an Ether header, an IP header, a UDP header, an L2TP header, a PPP header, and a payload of a tunnel packet. Here, when the header sample 80b corresponds to top 128 bytes of a sampled packet, and if the length of the sampled packet is longer than 128 bytes, the header sample 80b constitutes a part of the sampled packet. Furthermore, as illustrated in FIG. 3, a payload 80c of the tunnel packet contains an IP header, a TCP header, and a part of a payload of an internal user packet.

In this manner, the flow information 80 contains information on the header of the user packet. Therefore, if it is possible to identify the position of the header of the user packet in the flow information 80 and extract the header, it is possible to perform analysis by applying a known IP packet analysis method.

(Analysis Using Template)

The first analysis unit 12 identifies a user packet in the flow information 80, i.e., a position of a header of an IP packet, by using a template. The first analysis unit 12 determines whether the header sample 80b of the flow information 80 matches any of templates that are based on tunneling protocols, and when determining that the header sample matches any of the templates, extracts information on a header of the IP packet from the header sample 80b on the basis of the matched template.

First, the first analysis unit 12 extracts a counter sample and a flow sample of the flow information 80, and records them in the recording unit 16. The recording unit 16 is, for example, a storage device, such as a hard disk or a semiconductor memory element.

Figure 4:
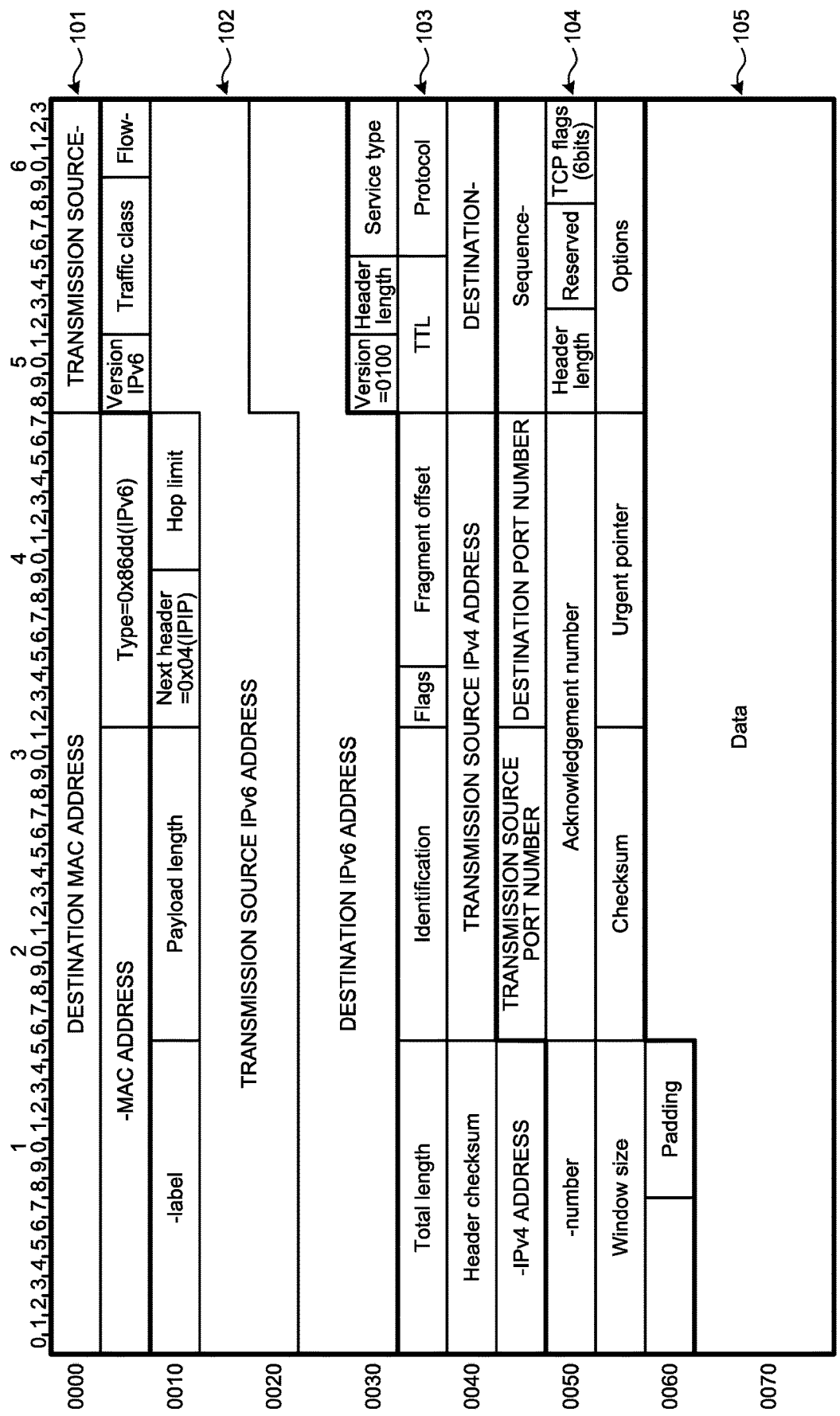
FIG. 4 is a diagram illustrating an example of a template according to the first embodiment.

The first analysis unit 12 confirms whether a template of a tunneling protocol that is prepared in advance is applicable to the header sample 80b of the flow information 80. Here, FIG. 4 illustrates an example of a template in a case where the tunneling protocol is IP-IP. FIG. 4 is a diagram illustrating an example of the template according to the first embodiment.

The template in FIG. 4 represents a position of each of fields in the top 128 bytes of the tunnel packet, with a table of 64 bits (8 bytes) in the horizontal direction and 16 lines in the vertical direction. For example, in FIG. 4, a value of a field of "destination MAC address" is set in a region corresponding to top 6 bytes (scales 0 to 47 on the first line) of the tunnel packet. Further, for example, in FIG. 4, a value of a field of "transmission source IPv4 address" is set in a 4-byte region corresponding to the $67^{th}$ byte to the $70^{th}$ byte (scales 16 to 47 on the ninth line) of the tunnel packet.

Furthermore, if the tunneling protocol is IP-IP, the user packet is an IPv4 packet. In this case, as illustrated in FIG. 4, the template contains an Ether header 101, an IPv6 header 102, an IPv4 header 103, a TCP header 104, and a payload 105. The first analysis unit 12 identifies, for example, a position of the Ipv4 header 103.

Moreover, a value is set in a specific field of the template. For example, as illustrated in FIG. 4, a value of "0x86dd" that indicates IPv6 is set in Type (from the $13^{th}$ byte to the $14^{th}$ byte and scales 32 to 47 on the second line) of the Ether header 101 of the template. Furthermore, a value of "0x04" that indicates IP-IP is set in Next header (the $21^{st}$ byte and scales 32 to 39 on the third line) of the IPv6 header 102 of the template. Moreover, a value of "0100" that indicates IPv4 is set in Version (a first half of the $55^{th}$ byte and scales 48 to 51 on the seventh line) of the IPv4 header 103 of the template. In the following description, values without "0x" represent binary numbers unless otherwise specified.

In this case, when the $13^{th}$ byte to the $14^{th}$ byte of the header sample are "0x86dd", when the $21^{st}$ byte is "0x04", and when the first half of the $55^{th}$ byte is "0100", the first analysis unit 12 determines that the header sample matches the template.

When the header sample matches the template, a position of each of the fields of the header sample is identified by using the template, information on the tunnel header, such as a transmission/reception IPv6 address of the IPv6 header, or information on the header of the internal user packet, such as a transmission/reception IPv4 address of an IPv4 packet, a protocol, a TCP, or a UDP port number is extracted, and the extracted information is transmitted to the recording unit 16.

Further, when the header sample does not match the template in FIG. 4, the first analysis unit 12 performs the same determination on a template that corresponds to a tunneling protocol, such as L2TP, GRE, or PPPoE, other than IP-IP. Furthermore, when the header sample does not match any of the templates that are prepared in advance, the first analysis unit 12 transmits the header sample to the second analysis unit 13.

(Analysis Corresponding to Variable-Length Option)

The second analysis unit 13 analyzes the header sample that is transmitted by the first analysis unit 12. Here, the first analysis unit 12 may have added Option (variable-length option) to the tunnel header of the header sample that has not matched any of the templates. The second analysis unit 13 performs analysis based on the assumption that Option is added to the tunnel header.

When Option is added to the tunnel header of the tunnel packet, a tunnel header length may be changed due to omission of Header length in the header, as compared to a case in which Option is not added, and, in some cases, the tunnel header length may not be clearly specified.

When the first analysis unit 12 determines that the header sample of the flow information does not match any of the templates, the second analysis unit 13 searches through the header sample for a byte sequence that matches search data in which a value that is set in a specific field of the tunnel header and a value that is set in a specific field of the IP packet are combined, and extracts information on the header of the IP packet from the header sample on the basis of a result of the search.

Here, when the tunneling protocol is L2TP, as illustrated in FIG. 3, a tunnel packet includes an Ether header, an IP header, a UDP header, an L2TP header, a PPP header, and a payload. Further, the payload contains a user communication packet, i.e., information on the header of an IP packet. In this case, even when the tunnel header length is a variable length and the tunnel header length is not indicated, it is possible to extract the IP packet from the payload as long as the top position of the IP packet is identified.

Therefore, the second analysis unit 13 creates search data by combining a value that is set in a Protocol filed in the PPP header and a value that is set in a Version field in the IP packet, and searches through the header sample for a byte sequence that matches the search data.

Here, in the Protocol field in the PPP header, "0x0021" is set in the case where the internal user packet is IPv4 and "0x0057" is set in the case of IPv6. Further, in the Version field in the IP header, "0100" is set in the case of IPv4 and "0110" is set in the case of IPv6.

When the trailing field of the tunnel header, i.e., the Protocol field of the PPP header, and the leading field of the IP packet, i.e., the Version field of the IP header, are continuous, a byte sequence of "00 21 4x" (hexadecimal representation and x is an integer from 0 to 9 or a value of a to f) may appear in the header sample in the case where the internal user packet is IPv4, and a byte sequence of "00 57 6x" (hexadecimal representation and x is an integer from 0 to 9 or a value of a to f) may appear in the header sample in the case of IPv6.

Therefore, the second analysis unit 13 searches through the header sample by using "00 21 4x" or "00 57 6x" as search data. Then, if a byte sequence that matches the search data is found, the second analysis unit 13 extracts information on the header of the internal user packet by assuming that a portion from "4x" is an IPv4 packet and a portion from "6x" is an IPv6 packet, and transmits the information to the recording unit 16.

Similarly, in the case where the tunneling protocol is PPPoE, the second analysis unit 13 searches through the header sample for search data that is created by combining a value of the Protocol field in the PPP header and a value of the Version field in the IP header that follows the Protocol field, and extracts information on the header of the internal user packet.

When the tunneling protocol is GRE, the second analysis unit 13 searches through the header sample for search data that is created by combining a value of a Protocol type field in a GRE header and a value of a Version field in the IP header that follows the Protocol type field in order to analyze the internal user packet, and extracts information on the header of the internal user packet.

Here, "0x0800" is set in the Protocol type field in the GRE header in the case where the internal user packet is IPv4, and "0x86dd" is set in the case of IPv6. Further, "0100" is set in the Version field in the IP header in the case of IPv4, and "0110" is set in the case of IPv6.

When the trailing field of the tunnel header, i.e., the Protocol type field of the GRE header, and the leading field of the IP packet, i.e., the Version field of the IP header, are continuous, a byte sequence of "08 00 4x" (hexadecimal representation and x is an integer from 0 to 9 or a value of a to f) may appear in the header sample in the case where the internal user packet is IPv4, and a byte sequence of "86 dd 6x" (hexadecimal representation and x is an integer from 0 to 9 or a value of a to f) may appear in the case of IPv6.

Therefore, the second analysis unit 13 searches through the header sample by using "08 00 4x" or "86 dd 6x" as search data. Then, if a byte sequence that matches the search data is found, the second analysis unit 13 extracts information on the header of the internal user packet by assuming that a portion from "4x" is an IPv4 packet and a portion from "6x" is an IPv6 packet, and transmits the information to the recording unit 16.

In this manner, by first assuming a tunneling protocol in advance and then preparing a byte sequence for specifying a protocol internal user packet and performing search, the second analysis unit 13 is able to identify an internal user packet and extract information on the header.

Further, when a byte sequence that matches the search data is obtained as a result of a search performed by the second analysis unit 13, the creation unit 15 creates a template based on a position of the byte sequence in the header sample. In this case, the second analysis unit 13 transmits, as format information, a field position of the tunneling protocol, positional information on the internal user packet, and a byte sequence as new template information to the creation unit 15, for example. Then, the creation unit 15 creates a new template based on the information transmitted by the second analysis unit 13, and makes setting such that the template can be used by the first analysis unit 12. Then, the first analysis unit 12 performs determination using the template that is created by the creation unit 15. With this configuration, the first analysis unit 12 is able to analyze the tunnel packet including the internal user packet. Further, the second analysis unit 13 transmits a header sample, for which a byte sequence that matches the search data is not found, to the third analysis unit 14.

(Analysis Corresponding to Arbitrary Tunneling Protocol)

The third analysis unit 14 analyzes the header sample transmitted by the second analysis unit 13. Here, the second analysis unit 13 may use a tunneling protocol for which search data is not prepared or may multiply add tunnel headers, with respect to a tunnel packet of a header sample for which a byte sequence that matches the search data is not found.

Therefore, when a byte sequence that matches the search data is not obtained as a result of the search performed by the second analysis unit 13, the third analysis unit 14 searches through the header sample for a byte sequence that matches search data that is a combination of values that are set in specific fields of the IP packet, and extracts information on a header of the IP packet from the header sample on the basis of a result of the search.

For example, when the internal user packet is IPv4 and a header length is 20 bytes, "0100" is set in the Version field of the Ipv4 header and "0101" is set in the Header length field that follows the Version field. Therefore, the top 1 byte of the IP header is "0x45".

Further, an IPv4 Flags and Fragment Offset field are present 6 bytes after the top of the Ipv4 header, and "0x0000" is set in the same fields when fragment is not performed and "0x4000" is set when fragment is inhibited.

With this configuration, the third analysis unit 14 searches through the header sample by using "45 xx xx xx xx xx 00 00" or "45 xx xx xx xx xx 40 00" (each of which is hexadecimal representation and x is an integer from 0 to 9 or a value of a to f) as search data. Then, if a byte sequence that matches the search data is found, the third analysis unit 14 transmits 20 bytes from "45" as an IPv4 header to the recording unit 16.

Here, in an IP packet that is not encapsulated, a value of the Version field of the IP header is stored at a position at 15 bytes from the top of the Ether frame. Therefore, when performing search by the above-described method with respect to an IP packet that is not encapsulated or a packet in which an IPv4 header is present in the tunnel header, the third analysis unit 14 extracts a position at 15 bytes from the top of the Ether frame as an IPv4 header of the internal user packet. Therefore, when the third analysis unit 14 uses a portion located after 16 bytes from the top of the Ether frame as a search target and when a plurality of byte sequences are obtained as search results, the third analysis unit 14 uses a trailing byte sequence among the byte sequences as a start position of the internal user packet, to thereby be able to search for a user packet in the tunnel with accuracy.

Furthermore, similarly to the case of the second analysis unit 13, the creation unit 15 creates a template based on a result of search performed by the third analysis unit 14 such that the template can be used by the first analysis unit 12. Then, the first analysis unit 12 performs determination using the template created by the creation unit 15.

Meanwhile, in some cases, the value of the Header length field may be "0110", i.e., the header length is 24 bytes (a routing protocol packet or the like), depending on a type of a packet. In this case, the third analysis unit 14 searches through the header sample by using "46 xx xx xx xx xx 00 00" or "46 xx xx xx xx xx 40 00" (each of which is hexadecimal representation and x is an integer from 0 to 9 or a value of a to f) as search data. At this time, the third analysis unit 14 may use a portion located after 16 bytes from the top of the Ether frame as a search target. Then, if a byte sequence that matches the search data is found, the third analysis unit 14 transmits 24 bytes that are located after "46" as an IPv4 header to the recording unit 16.

Further, in the case of the IPv6 packet, "0110" is set in the Version field of the IPv6 header, an 8-bit region following the Version field is a Traffic class field, and subsequent 20 bits correspond to a Flow label field. In this case, the third analysis unit 14 performs search on a portion located after 16 bytes from the top of the Ether frame, by assuming that all of the values set in the Traffic class field and the Flow label field are zero and by using "60 00 00 00" (hexadecimal representation) as search data with respect to the header sample.

Then, if a byte sequence that matches the search data is found, the third analysis unit 14 transmits a portion after "60" as an IPv6 header to the recording unit 16. Similarly to the case of the IPv4, when a plurality of byte sequences are obtained as search results, the third analysis unit 14 is able to use a trailing byte sequence as a start position of the internal user packet.

Further, when a plurality of values are set in the Traffic class field or the Flow label field, it may be possible to examine the packet in advance and set a search condition by using values used in the packet.

Furthermore, the aggregation unit 17 aggregates pieces of information recorded in the recording unit 16. The aggregation unit 17 may aggregate the number of packets in which a predetermined destination address is set, on the basis of information on the header of the internal user packet, for example. Moreover, the display unit 18 displays an analysis result on a predetermined terminal or the like. The display unit 18 may display the information on the header of the internal packet recorded in the recording unit 16 without any change, or may display an aggregation result obtained by the aggregation unit 17 by using a table or a graph.

Processes According to First Embodiment

Figure 5:
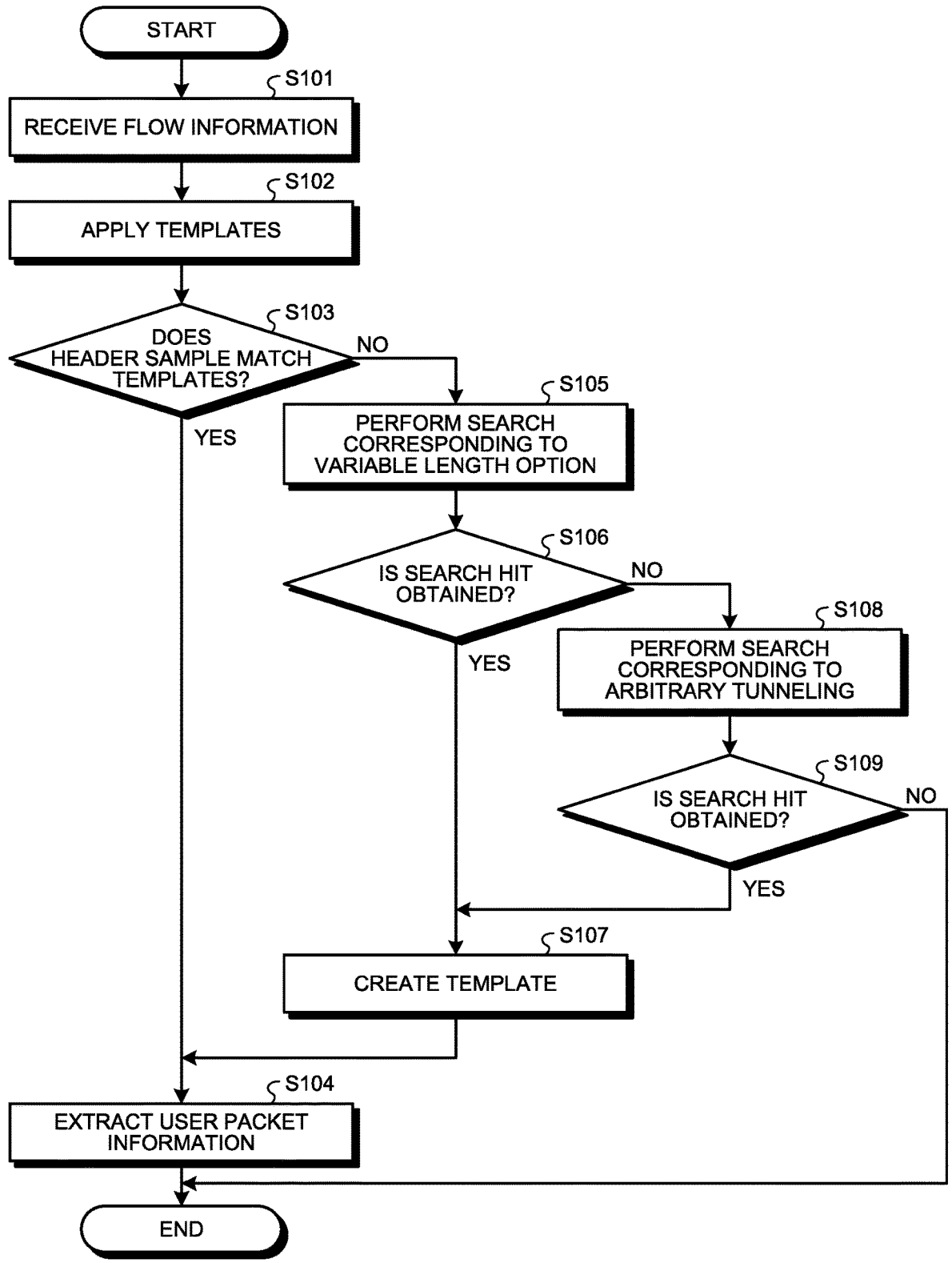
FIG. 5 is a flowchart illustrating the flow of processes performed by the flow information analysis apparatus according to the first embodiment.

The flow of processes performed by the flow information analysis apparatus 10 will be described with reference to FIG. 5. FIG. 5 is a flowchart illustrating the flow of processes performed by the flow information analysis apparatus according to the first embodiment. As illustrated in FIG. 5, first, the receiving unit 11 of the flow information analysis apparatus 10 receives flow information from the network device 50 of the IP network 1 (Step S101).

Subsequently, the first analysis unit 12 applies templates, which are prepared in advance, to a header sample that is included in the received flow information (Step S102), and determines whether the header sample matches the templates (Step S103). Here, if the header sample matches any of the templates (Yes at Step S103), the first analysis unit 12 extracts user packet information from the header sample, and records the user packet information in the recording unit 16 (Step S104). Then, the flow information analysis apparatus 10 terminates the processes.

If the header sample does not match any of the templates (NO at Step S103), the second analysis unit 13 performs search corresponding to a variable length option, by using search data in which a value that is set in a specific field of the tunnel header and a value that is set in a specific field of the IP packet are combined (Step S105). For example, the second analysis unit 13 performs search using search data in which the Protocol field of the PPP header and the Version field of the IP header are combined.

If a search hit is obtained by the second analysis unit 13 (YES at Step S106), the creation unit 15 creates a new template based on the position of the hit byte sequence in the header sample (Step S107). The template created by the creation unit 15 is used by the first analysis unit 12. Further, the second analysis unit 13 extracts information on the header of the user packet from the header sample, and records the information in the recording unit 16 (Step S104). Then, the flow information analysis apparatus 10 terminates the processes.

If a search hit is not obtained by the second analysis unit 13 (NO at Step S106), the third analysis unit 14 performs search corresponding to arbitrary tunneling by using search data that is a combination of values set in specific fields of the IP packet (Step S108). For example, the third analysis unit 14 performs search using search data in which the Version field, the Traffic class field, and the Flow label field of the IP header are combined.

If a search hit is obtained by the third analysis unit 14 (YES at Step S109), the creation unit 15 creates a new template based on the position of the hit byte sequence in the header sample (Step S107). The template created by the creation unit 15 is used by the first analysis unit 12. Further, the third analysis unit 14 extracts information on the header of the user packet from the header sample, and records the information in the recording unit 16 (Step S104). If a search hit is not obtained by the third analysis unit 14 (Step S109, No), the flow information analysis apparatus 10 terminates the processes.

Effects of First Embodiment

The receiving unit 11 receives flow information that contains a header sample that is a part of an IP packet to which a tunnel header is added. Further, the first analysis unit 12 determines whether the header sample of the flow information matches any of templates that are based on tunneling protocols, and when determining that the header sample matches any of the templates, extracts information on the header of the IP packet from the header sample on the basis of the matched template.

Furthermore, when the first analysis unit 12 determines that the header sample of the flow information does not match any of the templates, the second analysis unit 13 searches through the header sample for a byte sequence that matches search data in which a value that is set in a specific field of the tunnel header and a value that is set in a specific field of the IP packet are combined, and extracts information on the header of the IP packet from the header sample on the basis of a result of the search.

With this configuration, even when a tunneling protocol is used, it is possible to extract information on the header of the IP packet in the tunnel and it is possible to analyze detailed information on the user packet in the tunnel.

When a byte sequence that matches the search data is obtained as a result of a search performed by the second analysis unit 13, the creation unit 15 creates a template based on the position of the byte sequence in the header sample. In this case, the first analysis unit 12 may perform determination using the template created by the creation unit 15.

With this configuration, even when the tunnel packet does not match the template because a variable length option is added to the tunnel header for example, it is possible to extract information on the header of the IP packet in the tunnel.

If a byte sequence that matches the search data is not obtained as a result of the search performed by the the second analysis unit 13, the third analysis unit 14 searches through the header sample for a byte sequence that matches search data that is a combination of values that are set in specific fields of the IP packet, and extracts information on the header of the IP packet from the header sample on the basis of a result of the search.

With this configuration, even when a tunneling protocol for which search data is not prepared is used or when tunnel headers are multiply added, it is possible to extract information on the header of the IP packet in the tunnel.

Further, the second analysis unit 13 may search through the header sample for a byte sequence that matches search data in which a value that is set in the trailing field of the tunnel header and a value that is set in the leading field of the IP packet are combined.

With this configuration, it is possible to more reliably identify a boundary portion between the tunnel header and the IP packet, so that it is possible to extract information on the header of the IP packet in the tunnel with accuracy.

[System Configuration Etc.]

The components of the apparatuses illustrated in the drawings are conceptual function, and need not be physically configured in the manner illustrated in the drawings. In other words, specific forms of distribution and integration of the apparatuses are not limited to those illustrated in the drawings, and all or a part of the apparatuses may be functionally or physically distributed or integrated in arbitrary units depending on various loads or use conditions Further, all or an arbitrary part of the processing functions implemented by the apparatuses may be realized by a CPU and a program analyzed and executed by the CPU, or may be realized by hardware using wired logic.

In addition, of the processes described in the embodiments, all or a part of a process described as being performed automatically may also be performed manually. Alternatively, all or a part of a process described as being performed manually may also be performed automatically by known methods. Further, the processing procedures, control procedures, specific names, and information including various kinds of data and parameters illustrated in the above-described document and drawings may be arbitrarily changed unless otherwise specified.

[Program]

As one example, the flow information analysis apparatus 10 is implemented by installing a flow information analysis program that performs the above-described flow information analysis as package software or online software in a desired computer. For example, it may be possible to cause an information processing apparatus to function as the flow information analysis apparatus 10 by causing the information processing apparatus to execute the flow information analysis program. The information processing apparatus described herein includes a desktop personal computer or a notebook personal computer. In addition, the information processing apparatus includes a mobile communication terminal, such as a smartphone, a mobile phone, or a personal handyphone system (PHS), or a slate terminal, such as a personal digital assistant (PDA).

Furthermore, the flow information analysis apparatus 10 may be implemented as a flow information analysis server apparatus that adopts terminal devices used by users as clients and that provides services related to the above-described flow information analysis to the clients. For example, the flow information analysis server apparatus may be implemented as a server apparatus that adopts contents of user's input to a first source code as input and that outputs a second source code. In this case, the flow information analysis server apparatus may be implemented as a Web server, or a cloud that provides a service related to the above-described flow information analysis by outsourcing.

Figure 6:
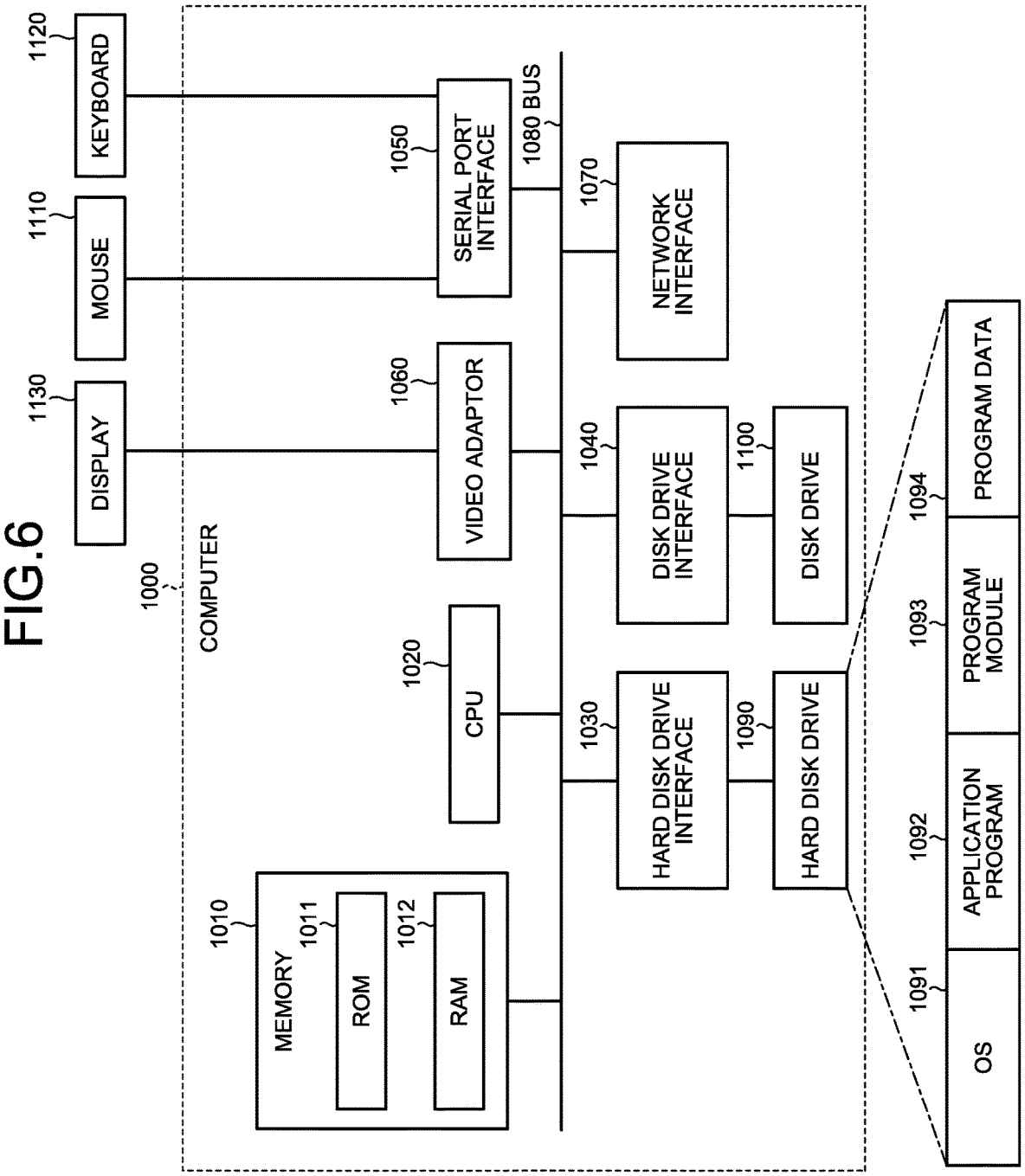
FIG. 6 is a diagram illustrating an example of a computer that realizes the flow information analysis apparatus by executing a program.

FIG. 6 is a diagram illustrating an example of a computer that realizes the flow information analysis apparatus by executing a program. A computer 1000 includes, for example, a memory 1010 and a CPU 1020. Further, the computer 1000 includes a hard disk drive interface 1030, a disk drive interface 1040, a serial port interface 1050, a video adaptor 1060, and a network interface 1070. All of the above-described units are connected to one another via a bus 1080.

The memory 1010 includes a read only memory (ROM) 1011 and a RAM 1012. The ROM 1011 stores therein, for example, a boot program, such as a basic input output system (BIOS). The hard disk drive interface 1030 is connected to a hard disk drive 1090. The disk drive interface 1040 is connected to a disk drive 1100. For example, a removable storage medium, such as a magnetic disk or an optical disk, is inserted into the disk drive 1100. The serial port interface 1050 is connected to, for example, a mouse 1110 and a keyboard 1120. The video adaptor 1060 is connected to, for example, a display 1130.

The hard disk drive 1090 stores therein, for example, an OS 1091, an application program 1092, a program module 1093, and program data 1094. In other words, the program that defines each of the processes performed by the flow information analysis apparatus 10 is implemented as the program module 1093 in which codes that are executable by the computer are written. The program module 1093 is stored in, for example, the hard disk drive 1090. For example, the program module 1093 for implementing the same processes as the functional configuration of the flow information analysis apparatus 10 are stored in the hard disk drive 1090. The hard disk drive 1090 may be replaced with a solid state drive (SSD).

Further, setting data used in the processes of the embodiment as described above is stored, as the program data 1094, in the memory 1010 or the hard disk drive 1090, for example. Then, the CPU 1020 loads the program module 1093 and the program data 1094 stored in the memory 1010 or the hard disk drive 1090 onto the RAM 1012, and executes them if needed.

The program module 1093 and the program data 1094 need not always be stored in the hard disk drive 1090, but may be stored in, for example, a removable storage medium and may be read by the CPU 1020 via the disk drive 1100 or the like. Alternatively, the program module 1093 and the program data 1094 may be stored in a different computer that is connected via a network (LAN, wide area network (WAN), or the like). Then, the program module 1093 and the program data 1094 may be read by the CPU 1020 from the different computer via the network interface 1070.

REFERENCE SIGNS LIST

1 IP NETWORK
10 FLOW INFORMATION ANALYSIS APPARATUS
11 RECEIVING UNIT
12 FIRST ANALYSIS UNIT
13 SECOND ANALYSIS UNIT
14 THIRD ANALYSIS UNIT
15 CREATION UNIT
16 RECORDING UNIT
17 AGGREGATION UNIT
18 DISPLAY UNIT
20, 21 USER TERMINAL
30 IN-HOUSE NETWORK DEVICE
40, 50, 60 NETWORK DEVICE
31, 41 TUNNEL
70, 73 IP PACKET
71, 72, 74 TUNNEL PACKET
80 FLOW INFORMATION 80a sFLow DATAGRAM
80b HEADER SAMPLE
80c PAYLOAD
101 Ether HEADER
102 IPv6 HEADER
103 Ipv4 HEADER
104 TCP HEADER
105 PAYLOAD

The invention claimed is:

1. A flow information analysis apparatus comprising: a memory; and a processor coupled to the memory and programmed to execute a process comprising:
   receiving flow information that contains a header sample that is a part of an IP packet to which a tunnel header is added;
   determining whether the header sample of the flow information matches any of templates that are based on tunneling protocols, and, when the determining determines that the header sample matches any of the templates, firstly extracting information on a header of the IP packet from the header sample on the basis of the matched template; and
   when the determining determines that the header sample of the flow information does not match any of the templates, firstly searching through the header sample for a byte sequence that matches search data in which a value that is set in a specific field of the tunnel header and a value that is set in a specific field of the IP packet are combined, and secondly extracting information on the header of the IP packet from the header sample on the basis of a result of the search.

2. The flow information analysis apparatus according to claim 1, the process further comprising:
   when a byte sequence that matches the search data is obtained as a result of a search performed by the firstly searching, creating a template based on a position of the byte sequence in the header sample, wherein
   the determining performs determination using the template created by the creating.

3. The flow information analysis apparatus according to claim 1, the process further comprising:
   when a byte sequence that matches the search data is not obtained as a result of the search performed by the firstly searching, secondly searching through the header sample for a byte sequence that matches search data that is a combination of values that are set in specific fields of the IP packet, and extract thirdly extracting information on the header of the IP packet from the header sample on the basis of a result of the search.

4. The flow information analysis apparatus according to claim 1, wherein the firstly searching searches through the header sample for a byte sequence that matches search data in which a value that is set in a trailing field of the tunnel header and a value that is set in a leading field of the IP packet are combined.

5. A flow information analysis method implemented by a flow information analysis apparatus, the flow information analysis method comprising:
   receiving flow information that contains a header sample that is a part of an IP packet to which a tunnel header is added;
   determining whether the header sample of the flow information matches any of templates that are based on tunneling protocols, and when the determining determines that the header sample matches any of the templates, extracting information on a header of the IP packet from the header sample on the basis of the matched template; and
   when the determining determines that the header sample of the flow information does not match any of the templates, searching through the header sample for a byte sequence that matches search data in which a value that is set in a specific field of the tunnel header and a value that is set in a specific field of the IP packet are combined, and extracting information on the header of the IP packet from the header sample on the basis of a result of the search.

6. A non-transitory computer-readable recording medium having stored a program for flow information analysis that causes a computer to execute a process comprising:
   receiving flow information that contains a header sample that is a part of an IP packet to which a tunnel header is added;
   determining whether the header sample of the flow information matches any of templates that are based on tunneling protocols, and when the determining determines that the header sample matches any of the templates, extracting information on a header of the IP packet from the header sample on the basis of the matched template; and
   when the determining determines that the header sample of the flow information does not match any of the templates, searching through the header sample for a byte sequence that matches search data in which a value that is set in a specific field of the tunnel header and a value that is set in a specific field of the IP packet are combined, and extracting information on the header of the IP packet from the header sample on the basis of a result of the search.

* * * * *